United States Patent [19]
Fujibayashi et al.

[11] Patent Number: 4,697,905
[45] Date of Patent: Oct. 6, 1987

[54] PHOTOGRAPHIC APPARATUS

[75] Inventors: Kazuo Fujibayashi; Tokuichi Tsunekawa, both of Kanagawa; Hiroshi Ohmura, Tokyo, all of Japan

[73] Assignee: Canon Kabushiki Kaisha, Japan

[21] Appl. No.: 802,760

[22] Filed: Nov. 27, 1985

[30] Foreign Application Priority Data

Dec. 3, 1984 [JP] Japan .................................. 59-255396
Sep. 21, 1985 [JP] Japan .................................. 60-209437

[51] Int. Cl.$^4$ .......................... G03B 3/00; G03B 7/099
[52] U.S. Cl. .................................... 354/406; 354/432; 354/479
[58] Field of Search ............................... 354/402–409, 354/429–434, 476–481

[56] References Cited

U.S. PATENT DOCUMENTS 4,104,651  8/1978  Matsumoto et al. ................ 354/407
4,414,470 11/1983  Nakaoka ......................... 354/406 X

FOREIGN PATENT DOCUMENTS 2839971  3/1980  Fed. Rep. of Germany ...... 354/476

Primary Examiner—W. B. Perkey
Attorney, Agent, or Firm—Toren, McGeady & Associates

[57] ABSTRACT

A photographic apparatus in which light entering through an objective is used in photo-electrically detecting the state of focus of a range finder area in the view field, whereby a mask for defining that area is arranged in the effective light beam at or near a predetermined focal plane of the objective and is made to serve as a light meter of thin film form constituting part of an exposure control system.

10 Claims, 9 Drawing Figures

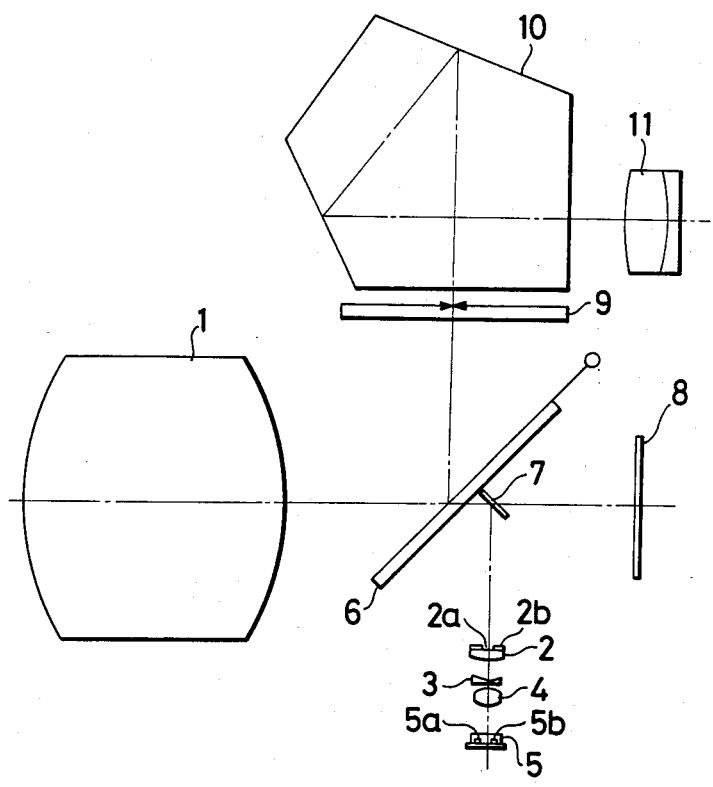

PHOTOGRAPHIC APPARATUS

BACKGROUND OF THE INVENTION

1. Field of the Invention

This invention relates to light metering devices of the TTL type for use in exposure control systems, and more particularly to the compatible arrangement of such light metering device with a range finder of the TTL type by using an amorphous silicon photo-diode (hereinafter abbreviated as "ASP" diode).

2. Description of the Related Art

In single lens reflex cameras, it has been the general practice that the sensor of the light meter is positioned either on the exit face of the pentagonal roof type prism of the finder system, or in the mirror box. This causes a drawback that no light value proportional to the F-number of the objective can be obtained, since the sensor is far away from the focal plane of the objective.

An attempt has been made to put the sensor at the side of the focusing screen by using a beam splitter of very small size positioned adjacent the screen to direct a splitoff portion of the finder light sideway to the sensor. Even in this case, a defect due to the long distance between the focal plane and the sensor is encountered.

Also, for an automatic focusing system built in such a camera, it is a prerequisite that the arrangement of an image sharpness sensor be made without adversely influencing the measurement of the brightness level of an object to be photographed. The optics for detecting the state of focus of an image formed by the objective, which is very suited to the single lens reflex camera, is to split the pupil of the objective into two parts from which two respective beams are obtained to form two second images of the same object behind a predetermined focal plane of the objective. By detecting the relative positions of these two images with respect to each other, the state of focus of the objective can be determined. Such an optics or so-called re-focusing system is proposed in Japanese Laid-Open Patent Application No. SHO 52-95221.

To install this focus detector in the single lens reflex camera, the presence of a limitation on the optical path length leads, in most cases, to making a central portion of the area of the quick return mirror semi-transparent and directing the transmitted light to the focus detector on the bottom of the mirror box.

Similar to this arrangement, light metering at the focal plane has been known where the light emerging from the semi-transparent area of the quick return mirror is focused to the sensor on the bottom of the mirror box, giving an advantage that the accuracy of measurement of the object brightness is improved while nevertheless hardly affecting the image on the focusing screen.

The simultaneous occurrence of both such light arrangements for the automatic focusing and light metering systems, however, will result in a very complicated structure of the bottom portion of the mirror box, which will in turn cause an objectionable increase in the size of the entire body of the camera.

Meanwhile, since a technique of fabricating ASP diodes on a substrate by vacuum evaporation has recently been developed, the use of such diodes for light metering is being proposed because they can be built in the camera without taking a large space which is advantageous.

SUMMARY OF THE INVENTION

An object of the present invention is to provide a possibility of metering light in a focal plane of a photographic lens for exposure controlling purposes.

Another object is to provide a complex system of a range finder and a light meter which does not preclude each other's functions.

Still another object is to provide such a system of simplified structure and minimized size without adversely affecting the observation of a finder image when in application to the single lens reflwx camera.

BRIEF DESCRIPTION OF THE DRAWINGS

FIG. 2 is a sectional view of the mask of FIG. 1A.

FIG. 3 is a schematic sectional view of a single lens reflex camera employing one form of the system of the invention.

DETAILED DESCRIPTION OF THE PREFERRED EMBODIMENTS

Figure 1A:
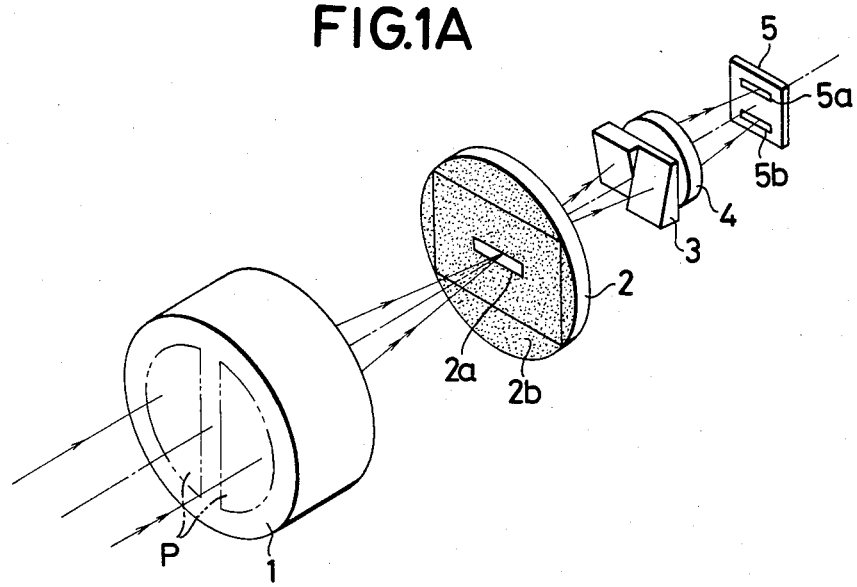
FIG. 1A is a perspective view of an embodiment of the invention.
Figure 1B:
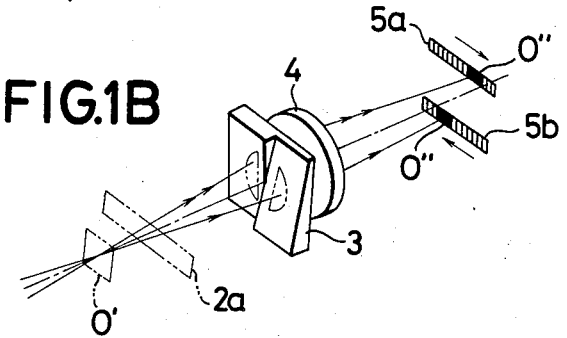
FIGS. 1B and 1C are fragmentary perspective views of the system of FIG. 1A with different states of focus.
Figure 1C:
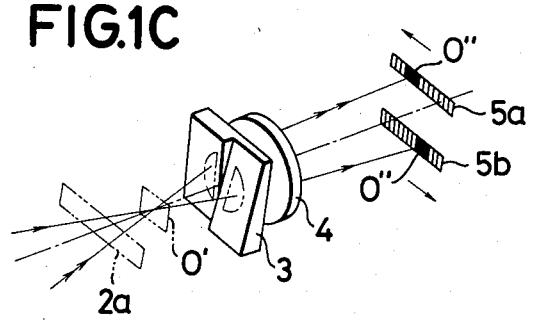

In FIGS. 1A, 1B and 1C, there is shown a first embodiment of the invention applied to a pupil-split type optics for an automatic focusing system, where a photographic lens 1 has a prescribed focal plane on which a field lens or pupil-image forming lens 2 is positioned not only to limit a field of view but also to form an image of the pupil P of the photographic lens 1. Two wedge prisms of opposed orientation constitute a split prism 3 (bi-prism) and split a pupil P-image bearing beam from the lens 2 into two parts which are then focused by a secondary image forming lens 4 onto a pair of respective laterally elongated linear arrays of photo-electric transducer elements 5a and 5b in a sensor unit of a range finder. Instead of the split prism 3 and the second lens 4, it is recommended to use a pair of secondary image forming lenses arranged laterally side by side. The point to note here is that the sensor arrays 5a and 5b must be placed on a common lateral line in spaced relation.

The front surface of the field lens 2 is formed to flatness, and carries a mask 2b made of ASP diode in the from of a thin film fabricated by vacuum evapolation techniques over the entire area of that surface except at a central rectangular portion 2a for defining a range finding target area.

The structure of the ASP diode constituting a photosensitive element of the light meter is shown in FIG. 2, where an opaque electrode layer "a", an amorphous silicon layer "b" and a transparent electrode layer "c" are applied on the front surface of the lens 2 in laminated relation by vacuum plating techniques. The use of such an opaque layer "a" as the electrode makes it possible for the light metering element on the field lens 2 to also serve as a range finding field stop. If the proportion of the range finder area to the entire area of the picture frame is large, as a close object and another or distant object lie in the same target area, it will become difficult for the automatic focusing system to determine which object it will be responsive to. Accordingly, the vertical range finder area is usually taken to a relatively narrow angle of field. In contrast to this, the light metering has, for production of a proper exposure generally over the entire film format, to be performed over the entire view area, or even when in the spot-metering mode, at a relatively wide view area, to obtain an average brightness level in the given target area.

Hence, the making a field stop mask for the field lens of the range finder by using the ASP diode as in this embodiment of the invention, despite the fact, strictly speaking, that the range finder area and the light meter area do not coincide with each other, provides the possibility of establishing a complex optical system whose focus detecting and light metering-on-the-focal-plane functions do not preclude each other, inasmuch as the light metering area has a relatively large share in the object to focus on.

In the system of FIG. 1A, for the state of focus to be detected, light entering through the photographic lens 1 after having once been focused on a plane of the range finder field stop 2a is split into two beams by the prism 3. With right- and left-hand such beams, the lens 4 forms two respective images on the lower and upper sensors 5b and 5a respectively.

When an image on the predetermined focal plane of the photographic lens 1 is in sharp focus, the images on the sensor 5a and 5b take their places just in vertical alignment. When out of focus, or when the first image O' of sharp focus is shifted ahead or behind the focal plane or the plane of the range finder field stop 2a as shown in FIGS. 1B and 1C respectively, the two second images O'' on the sensors 5a and 5b move away from that vertical alignment in opposite directions in either case. The subsequent operation of the range finder is well known in the art, and therefore its explanation is omitted here.

FIG. 3 illustrates an example of application of the optics of FIG. 1A to a single lens reflex camera, where the parts denoted by 1 to 5 are similar to those shown in FIG. 1. A quick return mirror 6 is half-mirrored partly or as a whole. A small mirror 7 reflects the transmitted light from the quick return mirror 6 to the mask 2 in an equivalent position to the position of a photographic film 8 with respect to the small mirror 7. A focusing screen 9 is for visual focusing, since an finder image can be viewed through a pentagonal roof type prism 10 and an eyepiece 11.

Even in this example, the mask 2b is constructed with laminated ASP photo-diode layers having the ability to measure the object brightness. Thus, the light metering is performed on the focal plane, while nevertheless hardly affecting the finder image on the focusing screen 9.

Figure 4:
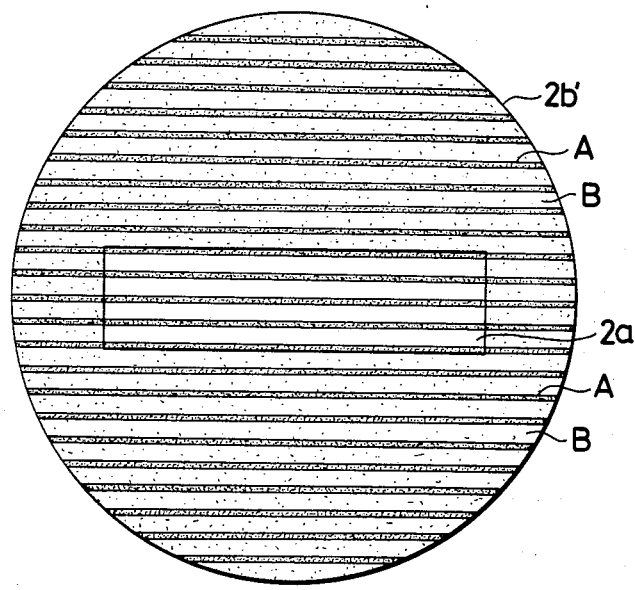
FIG. 4 is a plan view in exaggerated scale of another example of the mask.

Another embodiment of the invention is shown in FIG. 4 showing what structure a light receiving portion 2b' for the light metering-on-the-focal-plane positioned adjacent the pupil image forming lens 2 of FIG. 1A has.

The light receiving portion 2b' is made of a plurality of photosensitive elements A each of a long length with thin thickness and narrow width and of, for example, ASP diode, in parallel vacuum-deposited on a glass substrate B.

All area except a portion indicated by 2a is coated with an opaque layer of electrode to form a range finder area 2a. It should also be pointed out that the lines of photosensitive elements A are oriented to parallelism with the direction in which the second images O'' of FIG. 1A move as the image is defocused, or the direction in which the photoelectric transducer elements are arrayed in each of the sensors 5a and 5b.

With the use of such a second image forming system as shown in FIG. 1A, only when the object has its vertical patterns different from one another, are the sensors 5a and 5b able to discriminate between the states of focus. In other words, when the object has a simple pattern of lateral lines only, as this coincides with the direction in which the second images move as the first image is defocused, any shifted amount cannot be detected. This means that the range finder is insensitive to such lateral line patterns.

To take this into advantage, according to the invention, the lines of photosensitive elements A are made oriented to parallelism with the long side of the rectangular range finder area 2a, that is, the row of photoelectric transducer elements in each of the sensors 5a and 5b, thereby the light metering on the focal plane can be performed without causing production of any adverse effect on the detection of the state of focus.

Figure 5:
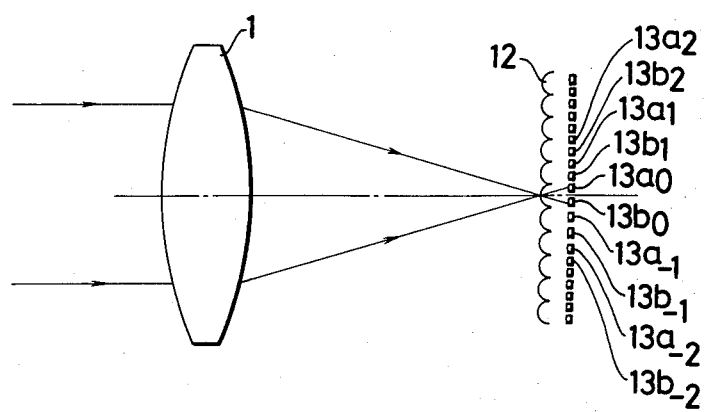
FIG. 5 is a schematic sectional view of another example of the range finder.

Still another embodiment of the invention is illustrated in FIG. 5 where a focus detecting optical system comprises a lenslet array 12 consisting of a great number of minute cylindrical lenses in a row on a predetermined focal plane of the photographic lens 1 and an equal number of pairs of photo-electric transducer elements $13a_0$ and $13b_0$, $13a_1$ and $13b_1$, ... $13a_n$ and $13b_n$, $13a_{-1}$ and $13b_{-1'}$ ... $13a_{-n}$ and $13b_{-n'}$ each in assignment to the corresponding one of the lenslets 12. In more detail, each lenslet forms an image of an exit pupil of the photographic lens 1 across the one of the pairs of photo-electric transducer elements which is assigned to that lenslet. For example, the lenslet on the optical axis forms that image on the transducer elements $13a_0$ and $13b_0$. The alternate ones of the transducer elements, namely, $13a_{-n'}$ ... $13a_{0'}$ ... $13a_{n'}$ constitute one linear sensor 13a, while the others consitute another linear sensor 13b. The detection of a discrepancy between the positions of the images on the two sensors 13a and 13b can indicate that the image formed by the lens 1 on the focal plane is out of focus.

Figure 6:
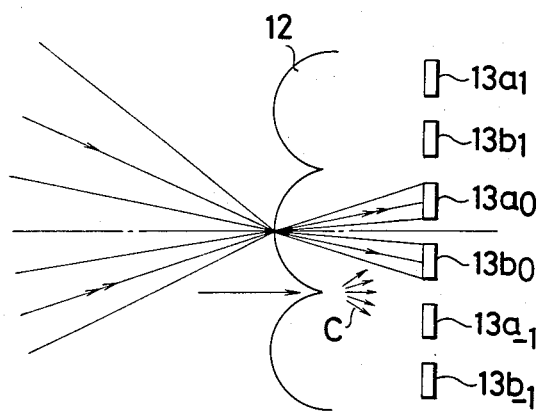
FIG. 6 is similar to FIG. 5 except for an enlarged scale in a fragmentary view.

It has, however, been found out that there is a high possibility of occurrence of light scattering in each boundary between the successive two of the lenslets as shown by a reference character C in FIG. 6. As the scattered light enters the adjacent elements, noise appears in the output of the sensors 13a and 13c, causing a problem of lowering the accuracy of focusing control. A method of removing such harmful light is to use a light shielding member in all the boundaries between the successive two of the lenslets.

Figure 7:
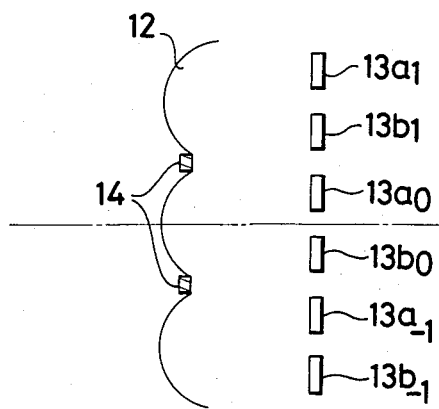
FIG. 7 is similar to FIG. 6 except that another embodiment of the invention is illustrated.

In still another embodiment of the invention, as shown by 14 in FIG. 7, a coating comprised of an amorphous silicon layer and an opaque electrode layer is applied to each boundary in the lenslet array 12. The thus-formed photosensitive elements 14 for the light meter can serve as that light shielding member. And, since the gap between the prescribed focal plane and a plane of the photosensitive elements 14 is very short, a substantial light-metering-on-the-focal-plane can be operated even in the spot metering mode. For the average metering mode, as the lenslet array 12 lies in the aperture of the range finding field stop mask, this mask is made up in the form of an ASP diode.

Thus, in this embodiment, the light shielding member of the boundaries between the lenslets is made also to serve as a portion of the sensor of the light meter, thereby giving not only the advantage of removing the noise from the focusing control signal, but an advantage that even in the target area for the range finder, the object brightness can be measured, though the emphasis in the range finder area is somewhat lower than that in the area surrounding it. The latter achieves an improvement of the accuracy of exposure control also.

It will be appreciated that the complex system of the invention is able to perform the light metering just on the focal plane and therefore has overcome the problem the method of metering light at a long distance from the optical axis or the focal plane of the photographic lens has, while nevertheless hardly affecting the finder image to allow for comfortable viewing of the finder.

What is claimed is:

1. A photographic apparatus comprising:
   focus detecting means receptive of the light passed through a photographic lens for detecting the state of focus of the photographic lens;
   masking means arranged substantially in coincidence with a predetermined focal plane of said photographic lens to limit a focus detecting area,
   whereby at least a portion of said masking means constitutes light metering means for controlling the exposure of said photographic apparatus.

2. A photographic apparatus according to claim 1, wherein said light metering means is a thin film formed on a substrate.

3. A photographic apparatus according to claim 2, wherein said substrate is a pupil image forming lens arranged adjacent the predetermined focal plane of said photographic lens.

4. A photographic apparatus according to claim 2, wherein said light metering means is made of amorphous silicon photo-diode.

5. A photographic apparatus according to claim 1, wherein said masking means is an opaque electrode of said light metering means.

6. A photographic apparatus according to claim 5, wherein the photoconductor of said light metering means is in the form of a great number of parallel stripes to each other.

7. A photographic apparatus according to claim 1, further comprising optical means between said predetermined focal plane and a light receiving surface of said focus detecting means to form a plurality of light intensity distributions from a light bundle passed through different domains of the pupil of said photographic lens.

8. A photographic apparatus according to claim 7, wherein said optical means comprises a split prism and a secondary image forming lens.

9. A photographic apparatus according to claim 7, wherein said optical means is a cylindrical lenslet array.

10. A photographic apparatus comprising a first image forming lens followed rearwardly of a predetermined focal plane thereof by a second image forming system for dividing a pupil of said first image forming lens into a plurality of parts, and light receiving means arranged adjacent an image plane of said second image forming system to receive second images formed with light beams passed through said plurality of pupil parts, whereby the difference between the positions of said image is detected to assess the state of focus of said first image forming lens, said apparatus further including a plurality of light metering elements of narrow stripe shape with a thin thickness arranged in a position substantially optically equivalent to an image receiving member, whereby said stripes are made oriented to parallelism with the direction in which said second images move as the first image is defocused.

* * * * *